United States Patent
Coscarella

(10) Patent No.: US 6,318,404 B2
(45) Date of Patent: Nov. 20, 2001

(54) BACKFLOW VALVE

(76) Inventor: Gabe Coscarella, 15703 - 64 Street, Edmonton, Alberta (CA), T5Y 2N5

(*) Notice: Subject to any disclaimer, the term of this patent is extended or adjusted under 35 U.S.C. 154(b) by 0 days.

(21) Appl. No.: 09/745,580

(22) Filed: Dec. 21, 2000

(30) Foreign Application Priority Data

Mar. 24, 2000 (CA) .................................................. 2302713

(51) Int. Cl.⁷ ........................ F16K 31/20; F16K 31/22; F16K 33/00
(52) U.S. Cl. .................. 137/420; 137/409; 137/448; 405/96
(58) Field of Search .................... 137/409, 420, 137/448; 141/198; 4/393, 394, 395, 441, 442, 669, 679, 687, 688; 405/96

(56) References Cited

U.S. PATENT DOCUMENTS

| | | | |
|---|---|---|---|
| 194,676 | | 8/1877 | Hansen ............................ 137/527 |
| 199,696 | | 1/1878 | Dikeman ......................... 137/448 |
| 271,644 | * | 2/1883 | Lowrie ............................ 137/420 |
| 289,108 | | 11/1883 | Johnson .......................... 137/409 |
| 384,396 | * | 6/1888 | Shepherd ........................ 137/420 |
| 1,031,567 | * | 7/1912 | Miller ............................. 137/420 |
| 1,113,648 | * | 10/1914 | Karlson .......................... 137/420 |
| 1,183,692 | * | 5/1916 | Strout ............................. 137/448 |
| 1,205,199 | | 11/1916 | Healy ............................. 137/448 |
| 1,464,614 | * | 8/1923 | Nacey et al. .................... 137/420 |
| 1,584,666 | | 5/1926 | Shockley ........................ 137/409 |
| 1,606,396 | | 11/1926 | Blom .............................. 137/409 |
| 1,612,195 | * | 12/1926 | Kirchhan et al. ............... 137/448 |
| 1,861,397 | | 5/1932 | Khun .............................. 137/448 |
| 1,864,443 | * | 6/1932 | Khun .............................. 137/448 |
| 1,924,498 | | 8/1933 | House ............................. 137/409 |
| 2,638,178 | | 5/1953 | McRill ............................ 137/409 |
| 2,695,072 | | 11/1954 | Hauslein ......................... 137/448 |
| 2,928,410 | * | 3/1960 | Del Vecchio ................... 137/448 |
| 3,176,707 | | 4/1965 | Wilson ........................... 137/448 |
| 3,626,521 | | 12/1971 | Delco ............................. 137/448 |
| 3,781,920 | | 1/1974 | Browne et al. .................. 4/441 |
| 3,933,444 | | 1/1976 | Kilgore .......................... 48/192 |
| 3,974,654 | | 8/1976 | Mirto, Jr. ........................ 137/409 |
| 4,324,506 | | 4/1982 | Steinke .......................... 405/96 |
| 4,475,571 | * | 10/1984 | Houston, Jr. et al. ........... 137/430 |
| 4,503,881 | * | 3/1985 | Vecchio .......................... 137/448 |
| 4,544,027 | | 10/1985 | Goldberg et al. ............... 165/95 |
| 4,787,103 | | 11/1988 | Endo .............................. 4/441 |
| 4,844,610 | | 7/1989 | North, Jr. ....................... 356/73 |
| 4,891,994 | | 1/1990 | Barba ............................. 74/2 |
| 5,234,018 | | 8/1993 | Grachal et al. ................. 137/244 |
| 5,398,735 | * | 3/1995 | Lagache ......................... 137/448 |
| 5,406,972 | * | 4/1995 | Coscarella et al. ............. 137/448 |
| 5,669,405 | | 9/1997 | Engelmann ..................... 137/115.07 |
| 5,819,791 | | 10/1998 | Chronister et al. ............. 137/512.1 |
| 5,934,313 | | 8/1999 | Brothers et al. ................ 137/351 |
| 5,947,152 | | 9/1999 | Martin et al. ................... 137/527.2 |

FOREIGN PATENT DOCUMENTS 2114602    7/1997   (CA) .............................. E03F/7/04

OTHER PUBLICATIONS

Product information for the ZURN Z–1091 Backwater Valve, Zurn Industries Limited, 1 page, dated at least as early as Dec. 2000.

\* cited by examiner

*Primary Examiner*—George L. Walton
(74) *Attorney, Agent, or Firm*—Davis & Bujold, P.L.L.C.

(57) ABSTRACT

A backflow valve which includes a closure gate pivotally mounted along a substantially vertical pivot axis to one of the opposed sides of the valve body. A closure gate engaging profile positioned in a bottom of the valve body locks the closure gate in the open position. The closure gate is biased into the closed position. The closure gate moves to the closed position upon floating free of the closure gate engaging profile.

8 Claims, 6 Drawing Sheets

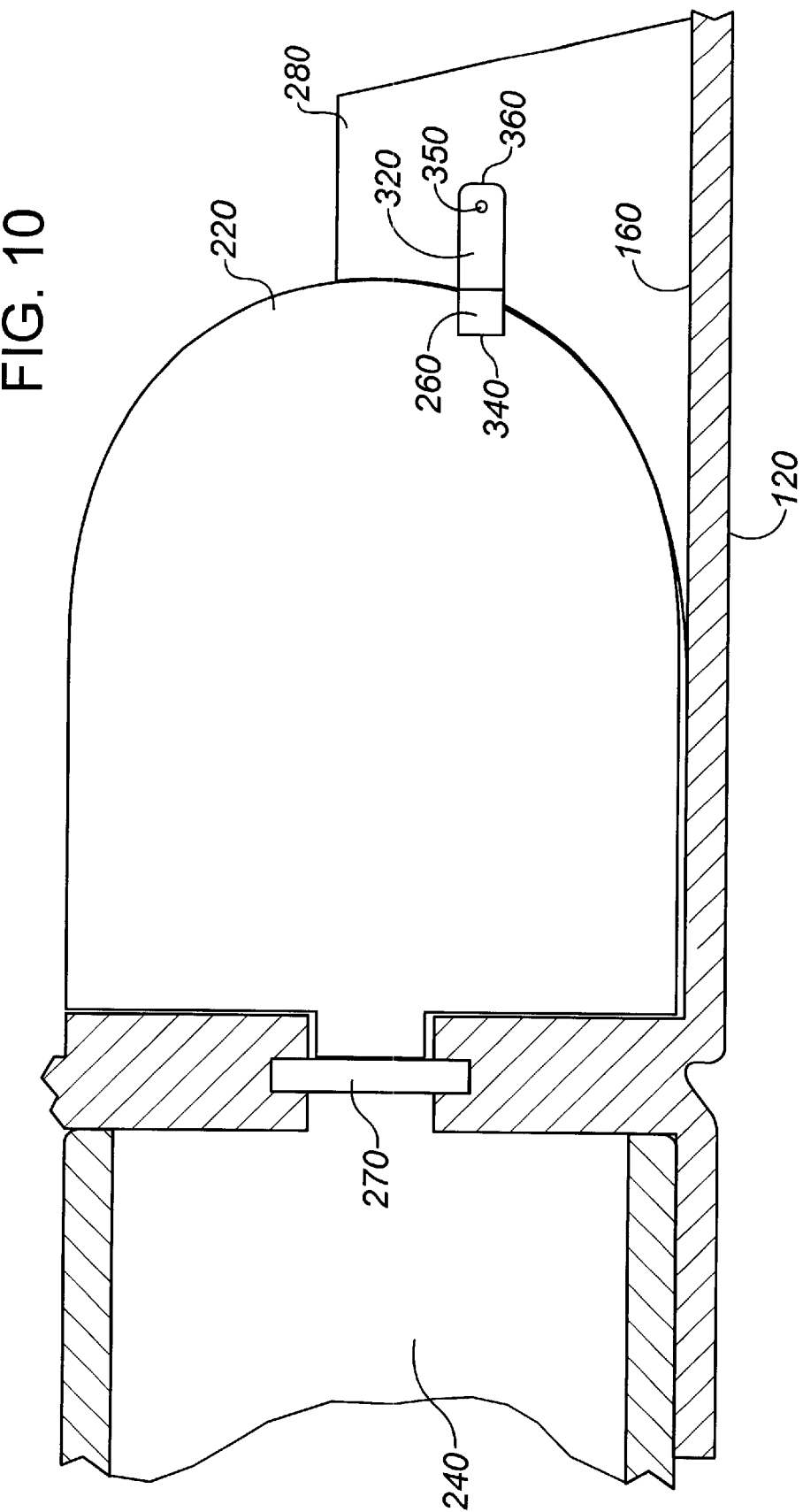

BACKFLOW VALVE

FIELD OF THE INVENTION

The present invention relates to a backflow valve and, in particular, a backflow valve with a side mounted closure gate.

BACKGROUND OF THE INVENTION

A backflow valve, also known as a backwater valve, is used to prevent a reversal of flow in a flow line. An example of a backflow valve is disclosed in Canadian Patent 2,114,602 and corresponding U.S. Pat. No. 5,406,972 granted to Coscarella et al.

The Coscarella et al reference discloses a backflow valve that has a pivoting closure gate with an open position to accommodate flow in a desired flow direction and a closed position to close off the flow line when there is a reversal of flow. The closure gate is hinged to the bottom of the valve housing. In the open position, flow passes over the closure gate with the closure gate serving as a spillway. Secured to the closure gate is a float. When the level of liquid rises, the float causes the closure gate to rise and the reversed direction of flow pushes the closure gate into the closed position.

The disadvantage of the backflow valve disclosed in the Coscarella et al reference is that when in the open position the liquid flow is always passing over the closure gate. In some applications, it would be advantageous to have a side mounted closure gate with the closure gate positioned to one side of the flow stream in order to reduce the exposure of the closure gate to the liquid flow. The closure gate disclosed in Coscarella et al, however, would not operate if the valve body of Coscarella et al were positioned on its side.

SUMMARY OF THE INVENTION

What is required is an alternative configuration of backflow valve in which there is a side mounted closure gate.

According to the present invention there is provided a backflow valve which includes a valve body adapted for use in a substantially horizontal orientation. The valve body has a top, a bottom, and opposed sides. A flow passage extends through the valve body. The flow passage has a longitudinal axis. A closure gate is pivotally mounted along an offset substantially vertical pivot axis to one of the opposed sides of the valve body for movement between an open position in which the closure gate is positioned on a plane substantially parallel to the longitudinal axis of the flow passage and a closed position in which the closure gate is positioned transverse to the longitudinal axis. A closure gate engaging profile is positioned in the bottom of the valve body along the one of the opposed sides to which the closure gate is pivotally mounted. The closure gate is locked in the open position by the closure gate engaging profile. The closure gate is capable of limited axial movement along the vertical pivot axis. The closure gate has a float which causes the closure gate to float free of the closure gate engaging profile in the bottom of the valve body as water rises. Means are provided for biasing the closure gate into the closed position. The closure gate moves to the closed position upon floating free of the closure gate engaging profile in the bottom of the valve body.

With the backflow valve, as described above, the closure gate is held in the open position to one side of the flow passage by the closure gate engaging profile. When liquid starts to rise, the closure gate moves to the closed position upon floating free of the closure gate engaging profile in tile bottom of the valve body.

Although beneficial results may he obtained through the use of the backflow valve, as described above, for improved performance it is preferred that the side closure gate be further removed from the liquid flow. Even more beneficial results may, therefore, be obtained when the valve body has a closure gate accommodating cavity in one of the opposed sides and the closure gate is positioned in the closure gate accommodating cavity when in the open position.

Although beneficial results may be obtained through the use of the backflow valve, as described above, debris floating behind the closure gate could potentially adversely affect the opening and closing of the closure gate. Even more beneficial results may, therefore, be obtained when the valve body has a baffle which restricts flow behind the closure gate when the closure gate is locked in the open position.

BRIEF DESCRIPTION OF THE DRAWINGS

These and other features of the invention will become more apparent from the following description in which reference is made to the appended drawings, wherein:

FIG. 10 is a detailed side elevation view of the locking member of the backflow valve as illustrated in FIG. 6.

DETAILED DESCRIPTION OF THE PREFERRED EMBODIMENT

Figure 1:
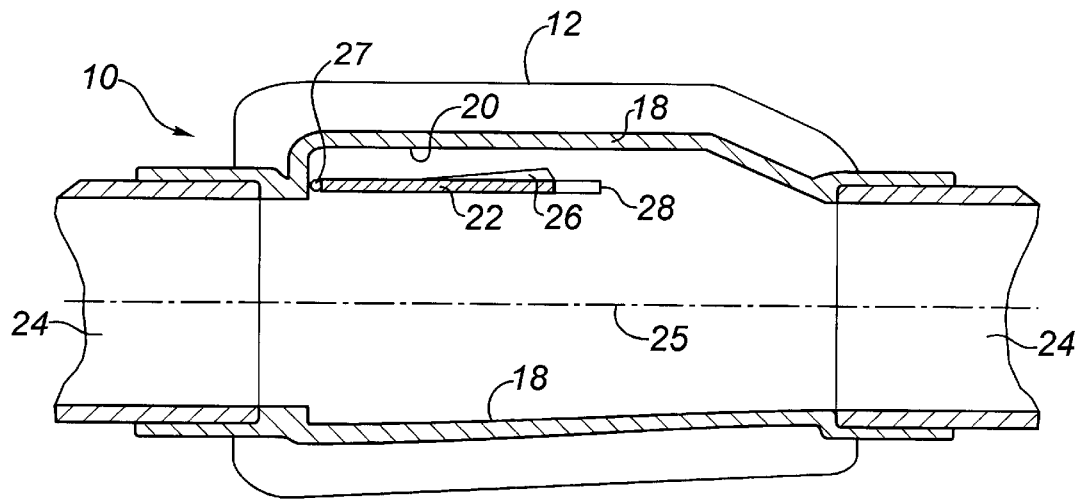
FIG. 1 is a top plan view, in section, of a first embodiment of a backflow valve constructed in accordance with the teachings of the present invention, in an open position.

The preferred embodiment, a backflow valve generally identified by reference numeral 10, will now be described with reference to FIGS. 1 through 5.

Figure 2:
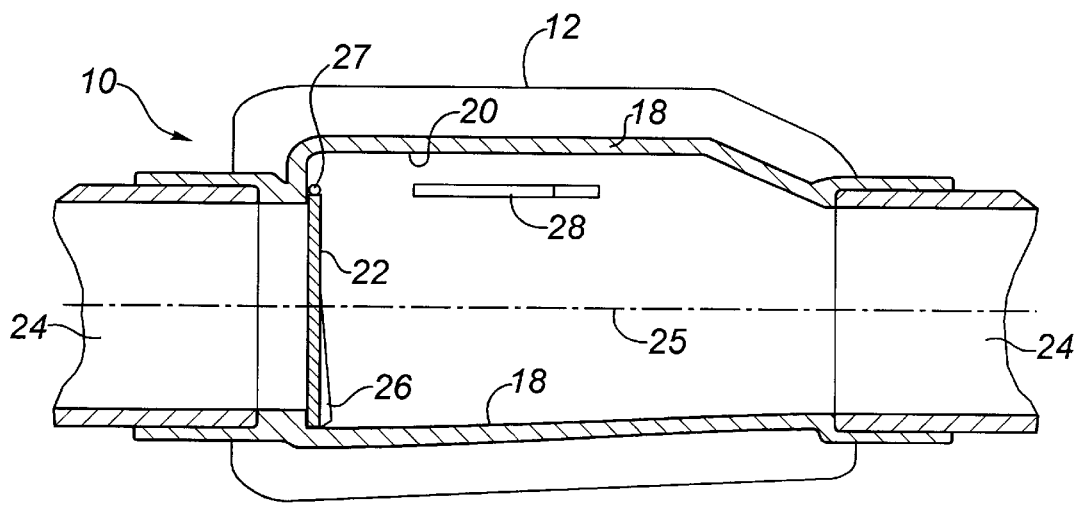
FIG. 2 is a top plan view, in section, of the backflow valve illustrated in FIG. 1, in a closed position.
Figure 3:
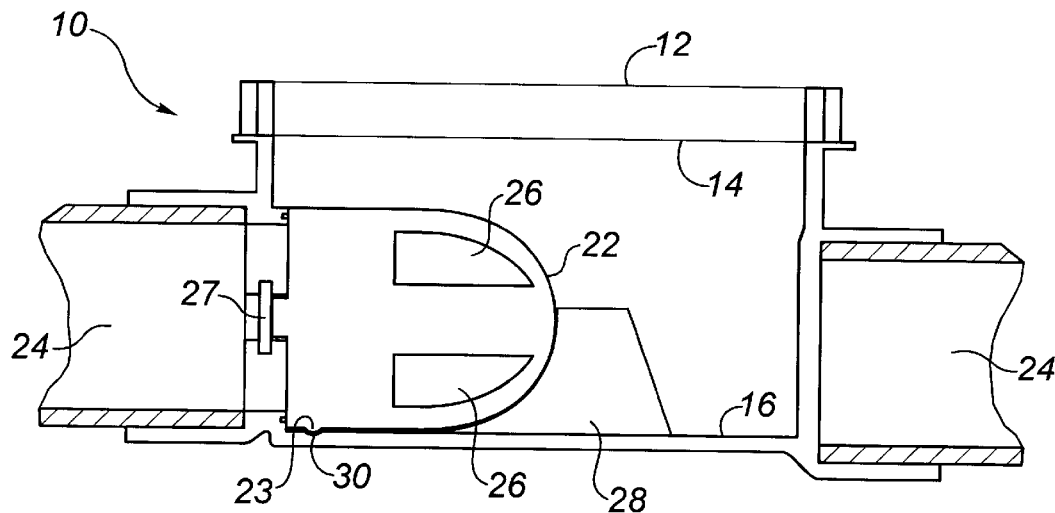
FIG. 3 is a side elevation view, in section, of the backflow valve illustrated in FIG. 1, in an open position.
Figure 4:
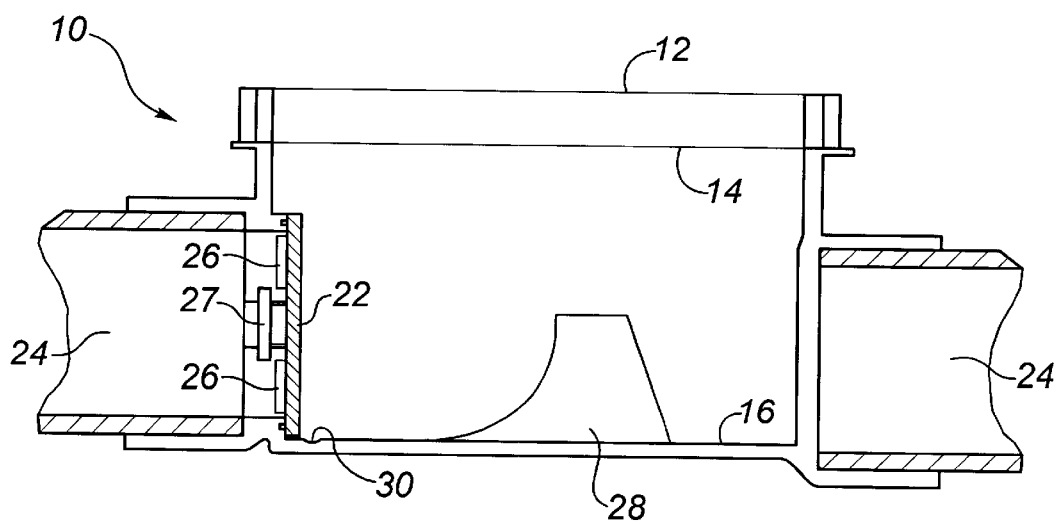
FIG. 4 is a side elevation view, in section, of the backflow valve illustrated in FIG. 1, in a closed position.

Referring to FIG. 1, there is provided a backflow valve comprised of a valve body 12 adapted for use in a substantially horizontal orientation. Referring to FIG. 3, valve body 12 has a top 14 and a bottom 16. Referring to FIGS. 1 and 2, valve body 12 has opposed sides 18. Valve body 12 has a closure gate accommodating cavity 20 in the one of opposed sides 18 to which a closure gate 22 is pivotally mounted for movement between an open position as illustrated in FIG. 1 and a closed position as illustrated in FIG. 2. Referring to FIGS. 1 and 2, a flow passage 24 extends through valve body 12, with flow passage 24 having a longitudinal axis, generally indicated by reference numeral 25. Referring to FIGS. 3 and 4, closure gate 22 is pivotally mounted along an offset substantially vertical pivot axis defined by hinge 27. Referring to FIG. 1, closure gate 22 is accommodated out of flow passage 24 in closure gate accommodating cavity 20 of one of opposed sides 18 of valve body 12. This permits movement between an open position in which closure gate 22 is positioned in closure gate accommodating cavity 20 on a plane substantially parallel to the longitudinal axis 25 of flow passage 24 and out of the flow stream as shown in FIG. 1 and a closed position in which closure gate 22 is positioned transverse to longitudinal axis 25 of flow passage 24 as shown in FIG. 2. The offset of the vertical pivot axis represented by hinge 27 is sufficient to bias closure gate 22 into the closed position.

Figure 5:
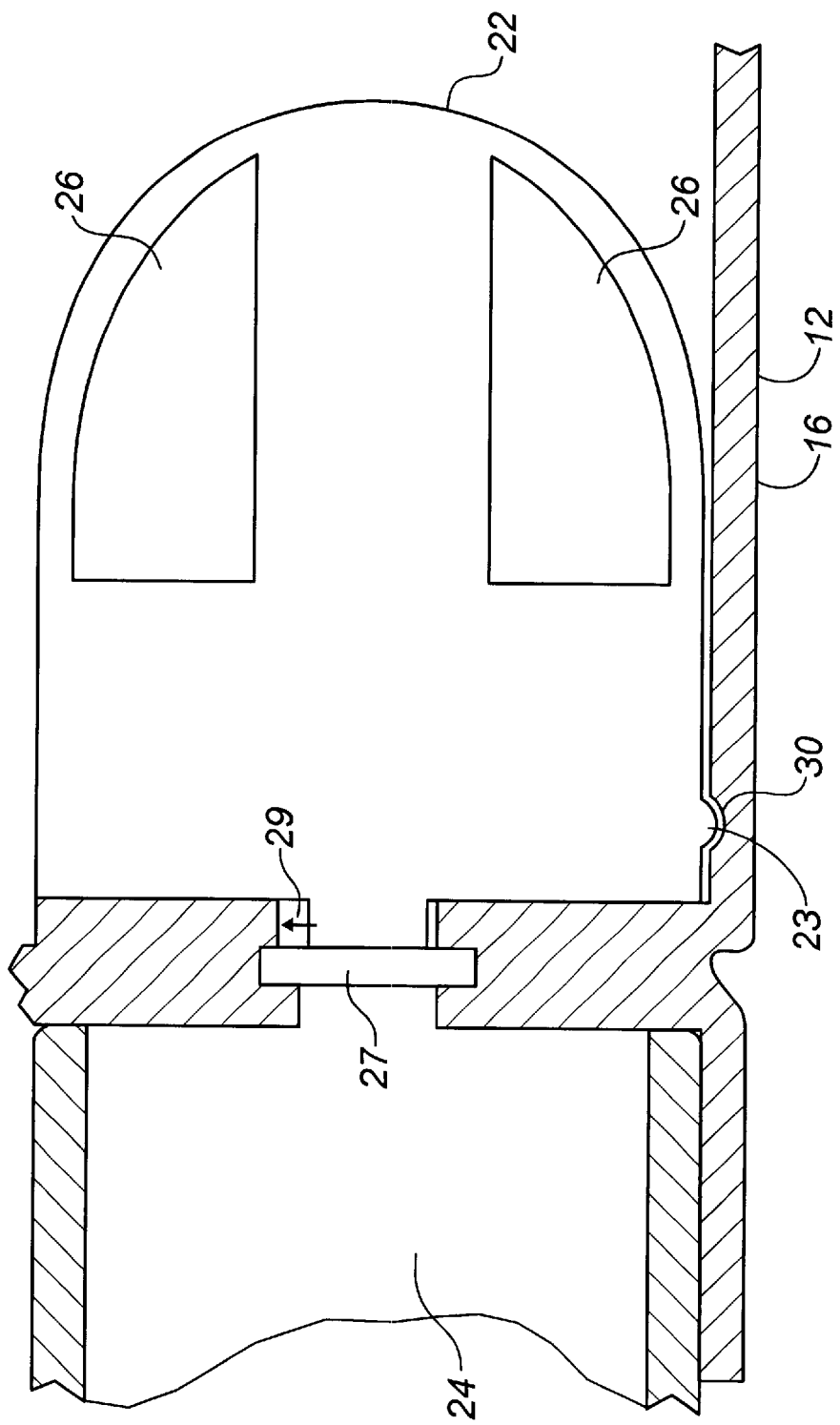
FIG. 5 is a detailed side elevation view of the closure gate engaging profile of the backflow valve illustrated in FIG. 3.

Referring to FIG. 5, closure gate 22 has an underlying engagement profile which, in the illustrated embodiment, is a semi-circular projection 23. A mating closure gate engaging profile which, in the illustrated embodiment, is in the form of a depression 30, is provided in bottom 16 of valve body 12 along the one of opposed sides 18 to which closure gate 22 is pivotally mounted. Closure gate 22 is locked in the open position when projection 23 of closure gate 22 engages depression 30 in bottom 16 of valve body 12. As indicated by arrows 29, closure gate 22 is capable of limited axial movement along the vertical pivot axis provided by hinge 27.

Referring to FIG. 3, closure gate 22 has built into its structure two floats 26. Floats 26 cause closure gate 22 to float as water rises. Closure gate 22 rises along hinge 27 until projection 23 is free of depression 30 in bottom 16 of valve body 12. Hinge 27 is positioned at an angle so that closure gate 22 closes by force of gravity when projection 23 is free of depression 30.

Referring to FIGS. 1 and 3, valve body 12 has a baffle 28 which restricts flow behind closure gate 22 when closure gate 22 is locked in the open position.

Once the teachings of the present invention are understood, the construction of the backflow valve can be modified in various ways. Referring to FIGS. 6 through 10 there is illustrated a second embodiment of a backflow valve generally referenced by numeral 10).

Figure 6:
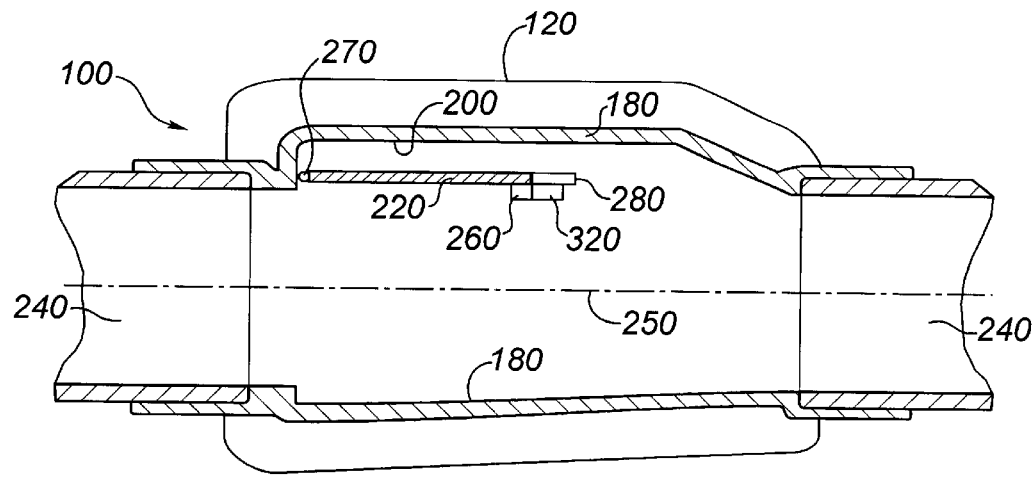
FIG. 6 is a top plan view, in section, of a second embodiment of a backflow valve constructed in accordance with the teachings of the present invention, in an open position.
Figure 7:
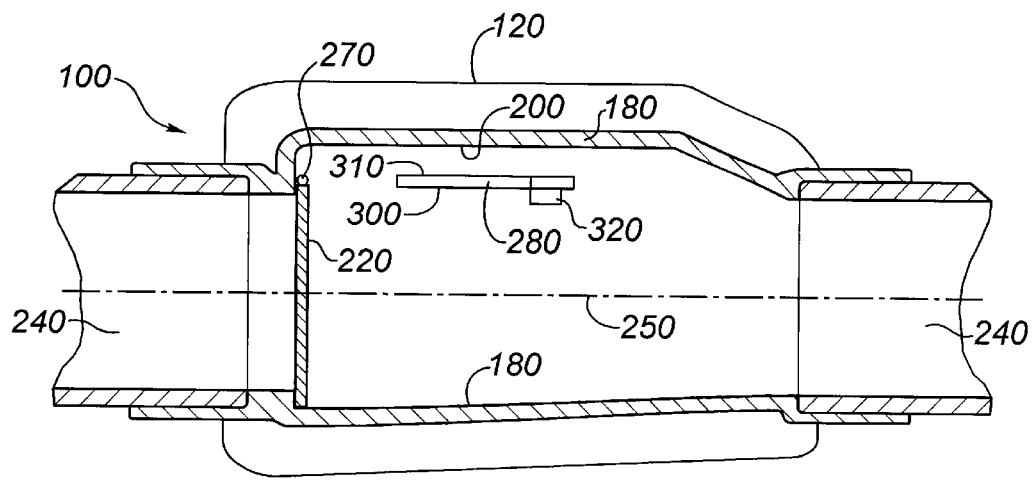
FIG. 7 is a top plan view, in section, of the backflow valve illustrated in FIG. 6, in a closed position.
Figure 8:
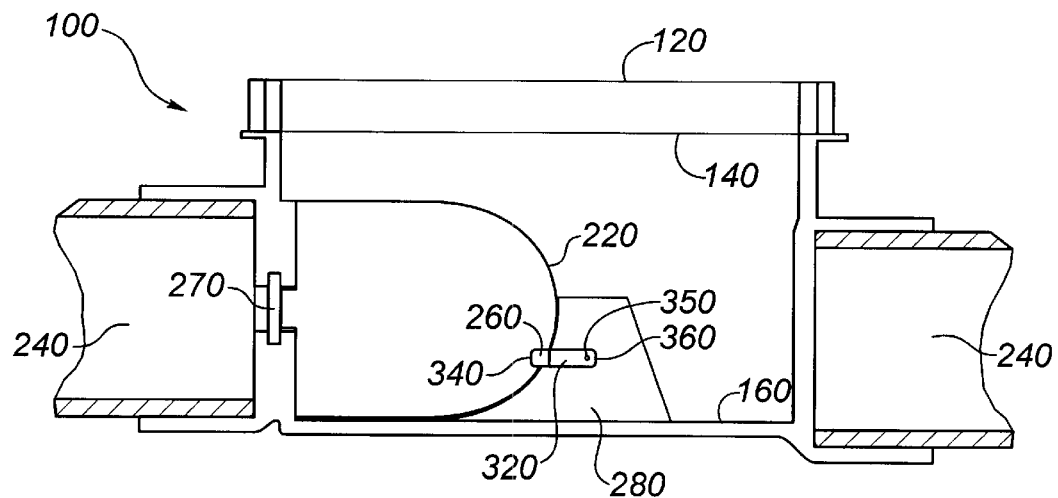
FIG. 8 is a side elevation view, in section, of the backflow valve illustrated in FIG. 6, in an open position.
Figure 9:
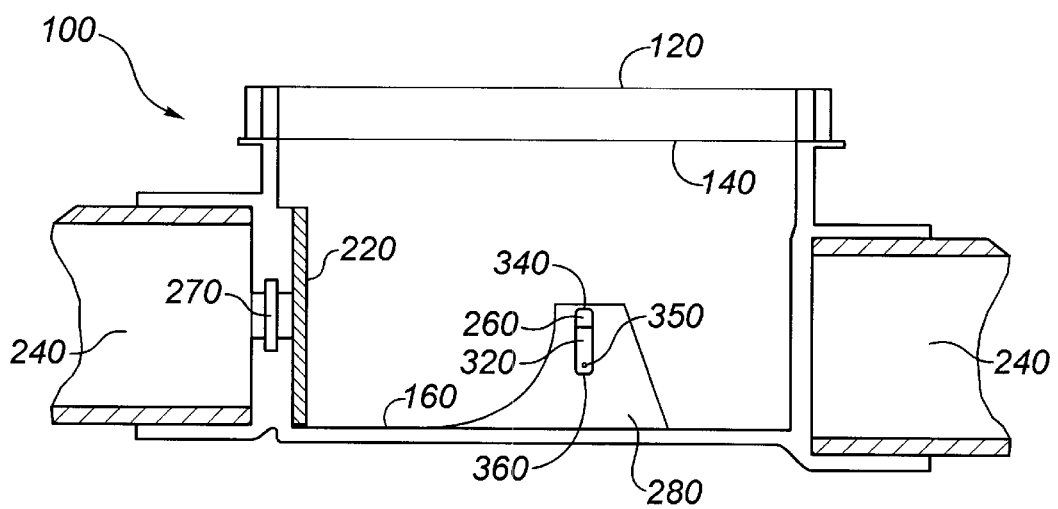
FIG. 9 is a side elevation view, in section, of the backflow valve illustrated in FIG. 6, in a closed position.

Referring to FIG. 6, there is provided d backflow valve 100 comprised of a valve body 120 adapted for use in a substantially horizontal orientation. Referring to FIG. 8, valve body 120 has a top) 140 and a bottom 160. Referring to FIGS. 6 and 7, valve body 120 has opposed sides 180. Valve body 120 has a closure gate accommodating cavity 200 in the one of opposed sides 180 to which a closure gate 220 is pivotally mounted for movement between an open position as illustrated in FIG. 6 and a closed position as illustrated in FIG. 7. Referring to FIGS. 6 and 7, a flow passage 240 extends through valve body 120, with flow passage 240 having a longitudinal axis, generally indicated by reference numeral 250. Referring to FIGS. 8 and 9, closure gate 220 is pivotally mounted along an offset substantially vertical pivot axis defined by hinge 270. Referring to FIG. 6, closure gate 220 is accommodated out of flow passage 240 in closure gate accommodating cavity 200 of one of opposed sides 180 of valve body 120. This permits movement between an open position in which closure gate 220 is positioned in closure gate accommodating cavity 200 on a plane substantially parallel to the longitudinal axis 250 of flow passage 240 and out of the flow stream as shown in FIG. 6 and a closed position in which closure gate 220 is positioned transverse to longitudinal axis 250 of flow passage 240 as shown in FIG. 7. The offset of the vertical pivot axis represented by hinge 270 is sufficient to bias closure gate 220 to the closed position.

Referring to FIGS. 6 and 8, valve body 120 has a baffle 280 which restricts flow behind closure gate 220 when closure gate 220 is locked in the open position. Referring to FIG. 7, baffle 280 has a first side 300 and a second side 310. A locking member 320 is positioned along first side 300 of baffle 280. Second side 310 of baffle 280 faces closure gate accommodating cavity 200. Referring to FIG. 10, locking member 320 has a first end 340 and a second end 360. First end 340 of locking member 320 engages closure gate 220 while second end 360 is pivotally mounted by a bolt 350 to baffle 280. Locking member 320 has a float 260 attached to first end 340.

Referring FIG. 8, closure gate 220 is locked in the open position when locking member 320 of baffle 280 engages closure gate 220. Referring to FIG. 9, float 260 causes first end 340 of locking member 320 to rise upward as water rises. As first end 340 of locking member 320 rises, locking member 320 disengages from closure gate 220. Hinge 270 is positioned at an angle so that closure gate 220 closes by force of gravity when closure gate 220 is no longer restrained by locking member 320.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A backflow valve, comprising:
    a valve body adapted for use in a substantially horizontal orientation, the valve body having a top, a bottom, and opposed sides;
    a flow passage extending through the valve body, the flow passage having a longitudinal axis;
    a closure gate with an integral float pivotally mounted along an offset substantially vertical pivot axis to the valve body for movement between an open position in which the closure gate is positioned on a plane substantially parallel to the longitudinal axis of the flow passage and a closed position in which the closure gate is positioned transverse to the longitudinal axis, the pivot axis being sufficiently offset from vertical as to bias the closure gate into the closed position, the closure gate being capable of limited axial movement along the vertical pivot axis;
    a closure gate engaging lock adapted to lock the closure gate in the open position, the closure gate engaging lock having an engaging portion thereon, said flow passage having an engaging profile in the bottom of the valve body along one of the opposed sides, the closure gate being locked in the open position by the closure gate engaging profile, the float causing the closure gate to move along the vertical pivot axis and float free of the closure gate engaging profile in the bottom of the valve body as water rises as water rises to a predetermined level due to backflow conditions.

2. The backflow valve as defined in claim 1, wherein the valve body has a closure gate accommodating cavity in one of the opposed sides, the closure gate being positioned in the closure gate accommodating cavity when in the open position.

3. The backflow valve as defined in claim 1, wherein the valve body has a baffle which restricts flow behind the closure gate when the closure gate is locked in the open position.

4. A backflow valve, comprising:
    a valve body adapted for use in a substantially horizontal orientation, the valve body having a top, a bottom, and opposed sides;

a flow passage extending through the valve body, the flow passage having a longitudinal axis;

a closure gate pivotally mounted along an offset substantially vertical pivot axis to the valve body for movement between an open position in which the closure gate is positioned on a plane substantially parallel to the longitudinal axis of the flow passage and a closed position in which the closure gate is positioned transverse to the longitudinal axis, the pivot axis being sufficiently offset from vertical as to bias the closure gate into the closed position;

a closure gate engaging locking member adapted to lock the closure gate in the open position, the locking member having a float activated release, such that the closure gate moves to the closed position by force of gravity upon the float activated release floating to the release position.

the locking member being supported by a profile disposed in the bottom of the flow passage, the locking member having a first end and a second end, the second end is pivotally mounted to the profile for pivotal movement between a locking position and a release position, the locking member including an integral float at the first end that pivots the locking member to the release position as liquid rises within the valve body due to a backflow condition.

5. The backflow valve as defined in claim 4, wherein the valve body has a closure gate accommodating cavity in one of the opposed sides, the closure gate being positioned in the closure gate accommodating cavity when in the open position.

6. The backflow valve as defined in claim 4, wherein the valve body has a baffle which restricts flow behind the closure gate when the closure gate is locked in the open position.

7. A backflow valve, comprising:

a valve body adapted for use in a substantially horizontal orientation, the valve body having a top, a bottom, and opposed sides, the valve body having a closure gate accommodating cavity in the one of the opposed sides to which the closure gate is pivotally mounted;

a flow passage extending through the valve body, the flow passage having a longitudinal axis;

a closure gate with an integral float pivotally mounted along an offset substantially vertical pivot axis in the closure gate accommodating cavity of the one of the opposed sides of the valve body for movement between an open position in which the closure gate is positioned in the closure gate accommodating cavity on a plane substantially parallel to the longitudinal axis of the flow passage and a closed position in which the closure gate is positioned transverse to the longitudinal axis, the pivot axis being sufficiently offset from vertical as to bias the closure gate into the closed position;

the valve body having a baffle which restricts flow behind the closure gate when the closure gate is locked in the open position;

a closure gate engaging profile in the bottom of the valve body along the one of the opposed sides to which the closure gate is pivotally mounted, the closure gate being locked in the open position by the closure gate engaging profile and a locking portion disposed on a portion of said closure gate;

the closure gate being capable of limited axial movement along the vertical pivot axis;

the float causing the closure gate to move along the vertical pivot axis and float free of the closure gate engaging profile in the bottom of the valve body as water rises and release the closure gate, such that the closure gate moves to the closed position by force of gravity.

8. A backflow valve, comprising:

a valve body adapted for use in a substantially horizontal orientation, the valve body having a top, a bottom, and opposed sides, the valve body having a closure gate accommodating cavity in one of the opposed sides;

a flow passage extending through the valve body, the flow passage having a longitudinal axis;

a closure gate pivotally mounted along an offset substantially vertical pivot axis to the valve body for movement between an open position in which the closure gate is positioned in the closure gate accommodating cavity on a plane substantially parallel to the longitudinal axis of the flow passage and a closed position in which the closure gate is positioned transverse to the longitudinal axis, the pivot axis being sufficiently offset from vertical as to bias the closure gate into the closed position;

the valve body having a baffle which restricts flow behind the closure gate when the closure gate is in the open position; and a closure gate engaging locking member adapted to lock the closure gate in the open position, the locking member being supported by a profile disposed in the bottom of the flow passage, the locking member having a first end and a second end, the second end of the locking member being pivotally mounted to the profile for pivotal movement between a locking position and a release position, the locking member including an integral float at the first end that pivots the locking member to the release position as liquid rises, due to a backflow condition, within the valve body and permits the closure gate to move to the closed position by force of gravity.

* * * * *